(12) United States Patent
Galvagnini et al.

(10) Patent No.: US 10,994,372 B2
(45) Date of Patent: May 4, 2021

(54) MACHINE FOR LASER WORKING OF TUBES AND PROFILED SECTIONS WITH A SCANNING SYSTEM FOR SCANNING THE TUBE OR PROFILED SECTION TO BE WORKED

(71) Applicant: ADIGE S.p.A., LEVICO TERME (IT)

(72) Inventors: Paolo Galvagnini, Nogaredo (IT);
Giovanni Dalfollo, Levico Terme (IT);
Paolo Benatti, Verona (IT); Luca Cevasco, Milan (IT); Claudio Cenati, Milan (IT); Lorenzo Molinari Tosatti, Bergamo (IT); Diego Parazzoli, Milan (IT)

(73) Assignee: ADIGE S.p.A., LEVICO TERME (IT)

( * ) Notice: Subject to any disclaimer, the term of this patent is extended or adjusted under 35 U.S.C. 154(b) by 580 days.

(21) Appl. No.: 15/537,510

(22) PCT Filed: Dec. 18, 2015

(86) PCT No.: PCT/IB2015/059778
§ 371 (c)(1),
(2) Date: Jun. 19, 2017

(87) PCT Pub. No.: WO2016/098069
PCT Pub. Date: Jun. 23, 2016

(65) Prior Publication Data
US 2019/0022800 A1    Jan. 24, 2019

(30) Foreign Application Priority Data
Dec. 19, 2014    (IT) .......................... TO2014A001076

(51) Int. Cl.
*B23K 26/08* (2014.01)
*B23K 26/38* (2014.01)
(Continued)

(52) U.S. Cl.
CPC ............ *B23K 26/38* (2013.01); *B23K 26/032* (2013.01); *B23K 26/0665* (2013.01);
(Continued)

(58) Field of Classification Search
CPC .... B23K 26/38; B23K 26/032; B23K 26/083; B23K 26/0884; B23K 26/0665; B23K 37/053–37/0538
(Continued)

(56) References Cited

U.S. PATENT DOCUMENTS 5,045,668 A    9/1991    Neiheisel et al.
5,925,268 A    7/1999    Britnell
(Continued)

FOREIGN PATENT DOCUMENTS

CN        202752753 A1    2/2013

OTHER PUBLICATIONS

International Search Report and Written Opinion dated Mar. 23, 2016, from International Application No. PCT/IB2015/059778, 11 pages.
(Continued)

*Primary Examiner* — Michael A Laflame, Jr.
(74) *Attorney, Agent, or Firm* — Meunier Carlin & Curfman LLC

(57) ABSTRACT

The machine includes a working head with a focusing device arranged to focus a laser beam on the surface of a tube or profiled section to be worked, a carriage and a scanning system arranged to scan a portion of the outline of the cross-section of the tube or profiled section. The working head and laser scanning module are mounted on the carriage, and the carriage is able to translate with respect to the tube or profiled section in longitudinal and transverse directions such that the working head and laser scanning module translate with the carriage. The scanning system includes at
(Continued)

least one laser scanning module including a laser emitter arranged to emit a light blade with which to illuminate a portion of the tube or profiled section and a camera arranged to acquire an image of the portion of tube or profiled section illuminated by the light blade.

7 Claims, 5 Drawing Sheets

(51) Int. Cl.
    *B23K 37/02*     (2006.01)
    *B23K 37/053*     (2006.01)
    *B23K 26/03*     (2006.01)
    *B23K 26/06*     (2014.01)
    *B23K 101/06*     (2006.01)

(52) U.S. Cl.
    CPC ........ *B23K 26/083* (2013.01); *B23K 26/0884* (2013.01); *B23K 37/0229* (2013.01); *B23K 37/0235* (2013.01); *B23K 37/0538* (2013.01); *B23K 2101/06* (2018.08)

(58) Field of Classification Search
    USPC .......................................... 219/121.6–121.86
    See application file for complete search history.

(56) References Cited

U.S. PATENT DOCUMENTS

| | | | |
|---|---|---|---|
| 2007/0151963 A1* | 7/2007 | Tanaka | B23K 26/06 219/121.78 |
| 2009/0321399 A1* | 12/2009 | Inagawa | B23K 26/40 219/121.69 |
| 2012/0145685 A1* | 6/2012 | Ream | B23K 26/0821 219/121.67 |
| 2013/0062324 A1* | 3/2013 | Dorsch | B23K 26/032 219/121.63 |
| 2013/0193125 A1 | 8/2013 | Nishiyama et al. | |
| 2014/0175071 A1* | 6/2014 | Pfitzner | B23K 26/032 219/121.81 |
| 2015/0343561 A1* | 12/2015 | Miller | B23K 26/082 219/121.81 |

OTHER PUBLICATIONS

Notification of the International Preliminary Report on Patentability dated Nov. 29, 2016, from International Application No. PCT/IB32015/059778, 7 pages.

* cited by examiner

MACHINE FOR LASER WORKING OF TUBES AND PROFILED SECTIONS WITH A SCANNING SYSTEM FOR SCANNING THE TUBE OR PROFILED SECTION TO BE WORKED

BACKGROUND

Field of the Invention

The present invention relates in general to a laser working machine for laser working of tubes and profiled sections, in particular a machine for laser cutting of tubes and profiled sections, provided with a scanning system for scanning the outline of the cross-section of the tube or profiled section to be worked.

In the following description and claims, the terms "tube" and "profiled section" are to be intended as referring to any elongated workpiece having a cross-section which is uniform (except for the manufacturing tolerances) along the longitudinal axis of the workpiece and may have any shape, either closed (for example circular, rectangular or square) or open (for example L-, C-, U-shape etc.). Moreover, the terms "longitudinal" and "transverse" are respectively used to identify the direction of the longitudinal axis of the tube or profiled section and a direction perpendicular to the longitudinal direction.

Description of Related Art

It is known to use scanning systems on machines for laser working of tubes and profiled sections in order to detect the geometry of the cross-section of the tube or profiled section to be worked. More specifically, stereoscopic laser scanning systems are known, which comprise a pair of laser scanning modules, also known with the acronym LSM, each of which comprises a laser emitter arranged to emit a light blade on the tube or profiled section to be worked, a camera arranged to acquire an image of the portion of the tube or profiled section to be worked that is illuminated by the light blade emitted by the respective laser emitter, and a processing unit arranged to process the images acquired by each camera to reconstruct the whole outline, or at least a portion thereof, of the cross-section of the tube or profiled section to be worked. By using such laser scanning systems it is possible to detect in real time the actual outline of the cross-section of the tube or profiled section to be worked, which actual outline may, depending on the manufacturing tolerances, differ more or less significantly from the nominal one. It is thus possible, for example, to centre the working to be carried out with reference to the actual outline of the cross-section of the tube or profiled section.

In the currently known solutions the laser scanning modules are mounted in a fixed position on the base of the machine and therefore progressively scan the tube or profiled section to be worked while the latter is being moved forward along the feed direction (coinciding with the longitudinal direction of the tube or profiled section). With such a way of mounting of the laser scanning modules, however, the cross-section of the tube or profiled section to be worked which is scanned is usually different from the one where the working is to be carried out. This may obviously result in errors in case the geometry of the cross-section where the working is to be carried out is different (due to the dimensional and/or geometric tolerances with which the tube or profiled section has been manufactured) from the one of the cross-section whose outline has been reconstructed by means of the scanning system. Furthermore, the known scanning systems are typically adapted to detect the geometry of tubes and profiled sections having a cross-section with predetermined shape and size.

BRIEF SUMMARY OF THE INVENTION

It is an object of the present invention to provide a laser working machine for laser working of tubes and profiled sections provided with a scanning system which is able to detect the geometry of tubes and profiled sections having cross-sections with different shapes and sizes and which is more precise than the prior art discussed above.

This and other objects are fully achieved according to the present invention by a machine for laser working of tubes and profiled sections having the characteristics set forth in the enclosed independent claim 1.

Advantageous embodiments of the invention are defined in the dependent claims, the subject-matter of which is to be intended as forming an integral and integrating part of the following description.

In short, the invention is based on the idea of providing a machine for laser working of tubes and profiled sections comprising a working head arranged to carry out a working on a tube or profiled section by means of a focussed laser beam, a carriage on which the working head is mounted and a scanning system arranged to detect the geometry of at least a portion of the outline of the cross-section of the tube or profiled section to be worked, wherein the carriage is able to translate relative to the tube or profiled section to be worked both in a longitudinal direction and in a transverse direction, wherein the scanning system comprises at least one laser scanning module including a laser emitter arranged to emit a light blade to illuminate a portion of the tube or profiled section to be worked, a camera arranged to acquire an image of the portion of tube or profiled section illuminated by the light blade, and a processing unit configured to process the images acquired by each camera to reconstruct the geometry of the whole outline, or at least a portion thereof, of the cross-section of the tube or profiled section to be worked, and wherein the working head and the at least one laser scanning module are mounted on the carriage so as to be drivingly connected for translation therewith both in the longitudinal direction and in the transverse direction.

Since it is mounted so as to be drivingly connected for translation, both in the longitudinal direction and in the transverse direction, with the carriage on which the working head is mounted, the at least one laser scanning module acquires the image of the outline (or at least of a portion thereof) of a cross-section of the tube or profiled section to be worked which is always in the same position with respect to a reference plane of the working head, for example with respect to a transverse vertical plane passing through the optical axis of the focussed laser beam emitted by the working head. Naturally, this ensures higher precision than the prior art. Moreover, by virtue of the at least one laser scanning module being drivingly connected for translation in the transverse direction with the carriage on which the working head is mounted, the scanning system of the machine according to the invention is able to scan tubes or profiled sections having cross-sections with different shapes and/or sizes.

Preferably, the laser scanning system comprises two or more laser scanning modules.

Preferably, the laser scanning modules are arranged in such a manner that the light blades generated by the laser emitters lie in a same plane. This plane is preferably a transverse vertical plane, i.e. a plane perpendicular to the longitudinal axis of the tube or profiled section to be worked.

Preferably, the machine is a machine for laser cutting of tubes or profiled sections.

According to an embodiment, the laser emitters of the laser scanning modules are arranged to emit light blades having the same wavelength. In this case, the images are acquired by the cameras of the laser scanning modules at different times, in order to avoid undesired effects of overlapping of the light blades, particularly in case of tubes or profiled sections with small-sized cross-sections, which effects might adversely affect the quality of the acquired image. Alternatively, the laser emitters of the laser scanning modules are arranged to emit light blades having different wavelengths, so as to allow the cameras to acquire simultaneously images of the tube or profiled section to be worked.

Preferably, the laser emitter and the camera of each laser scanning module are mounted in such a manner that the optical axis of the laser emitter lies in a vertical plane and is inclined by a given angle to the horizontal, while the optical axis of the camera is located in the same plane as the optical axis of the laser emitter and is inclined by a given angle to the latter.

BRIEF DESCRIPTION OF THE SEVERAL VIEWS OF THE DRAWINGS

Further characteristics and advantages of the present invention will result from the following detailed description, given purely by way of non-limiting example with reference to the appended drawings, where.

DETAILED DESCRIPTION OF THE INVENTION

Figure 1:
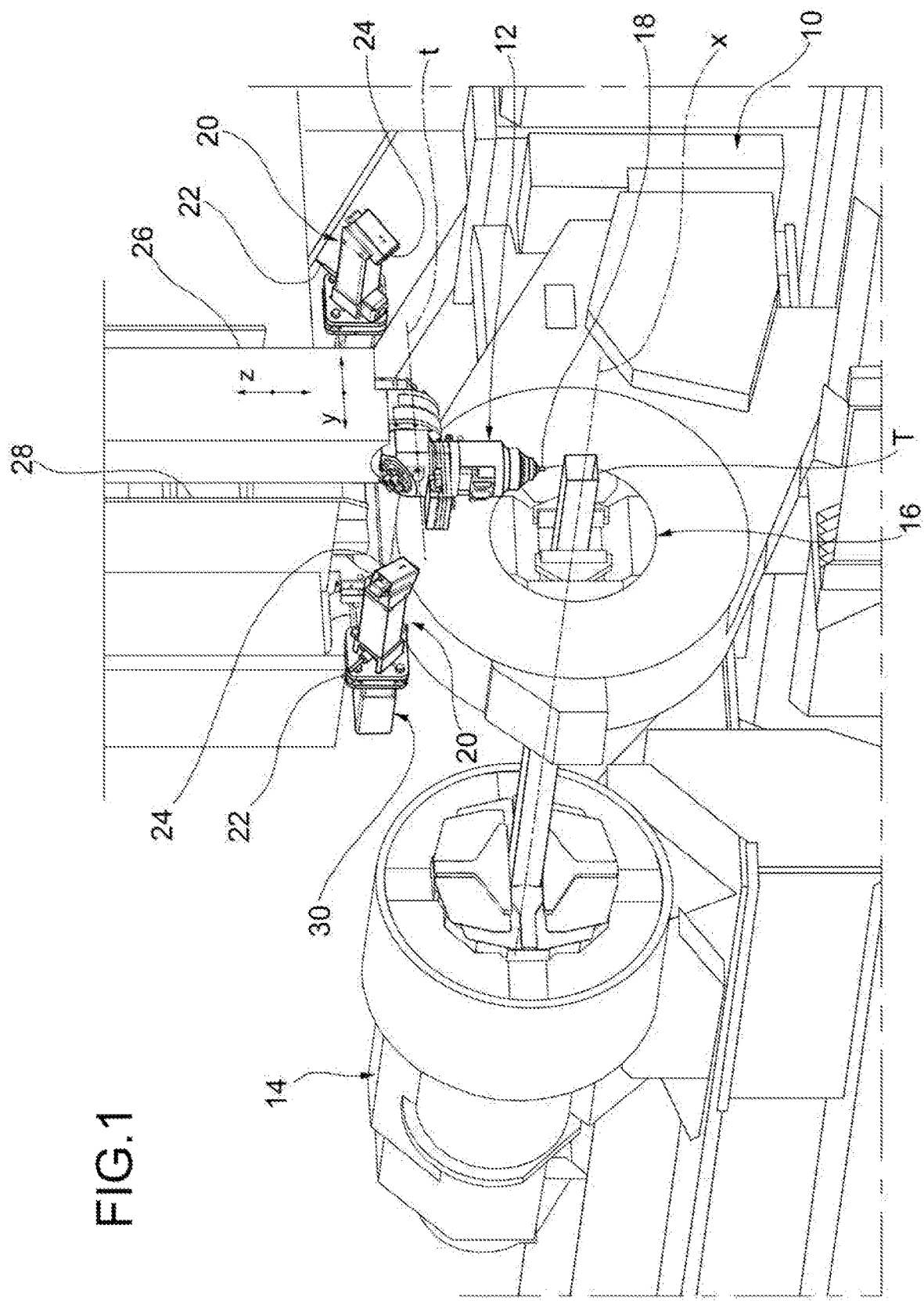
FIG. 1 is a perspective view partially showing a laser working machine for laser working of tubes or profiled sections provided with a scanning system according to an embodiment of the present invention.
Figure 2:
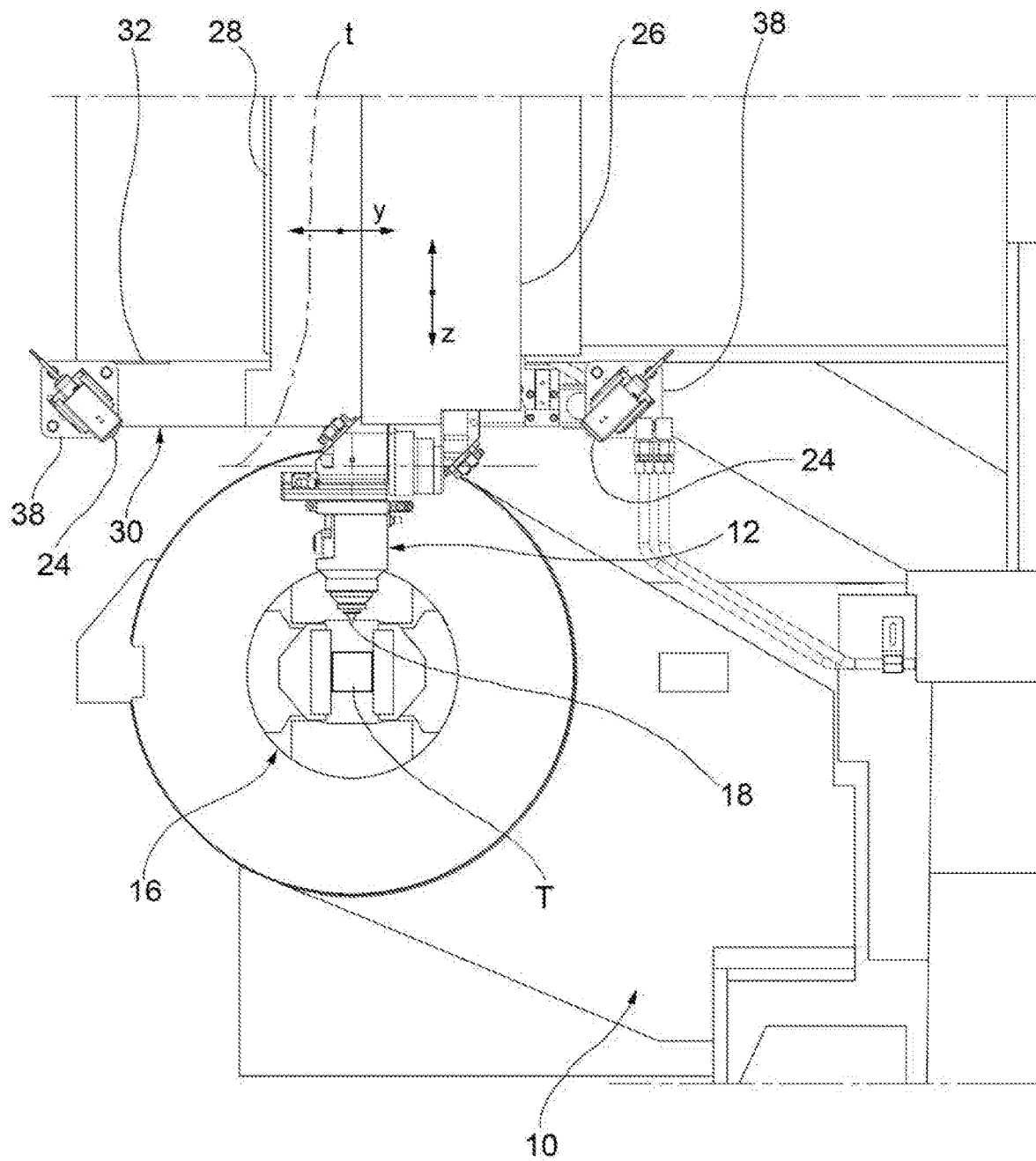
FIG. 2 is a front elevation view of the machine of FIG. 1.
Figure 3:
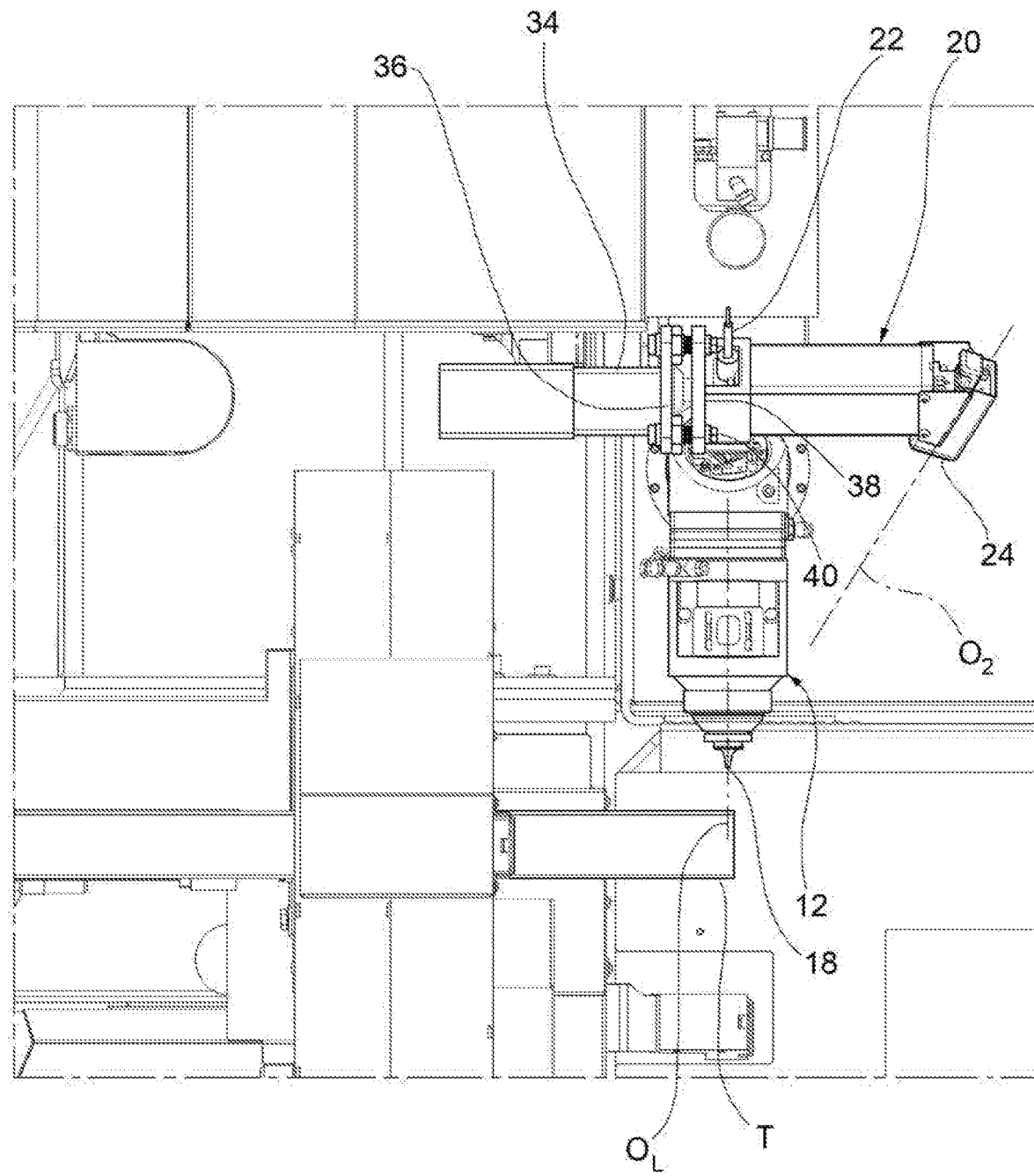
FIG. 3 is a side elevation view of the machine of FIG. 1.
Figure 4:
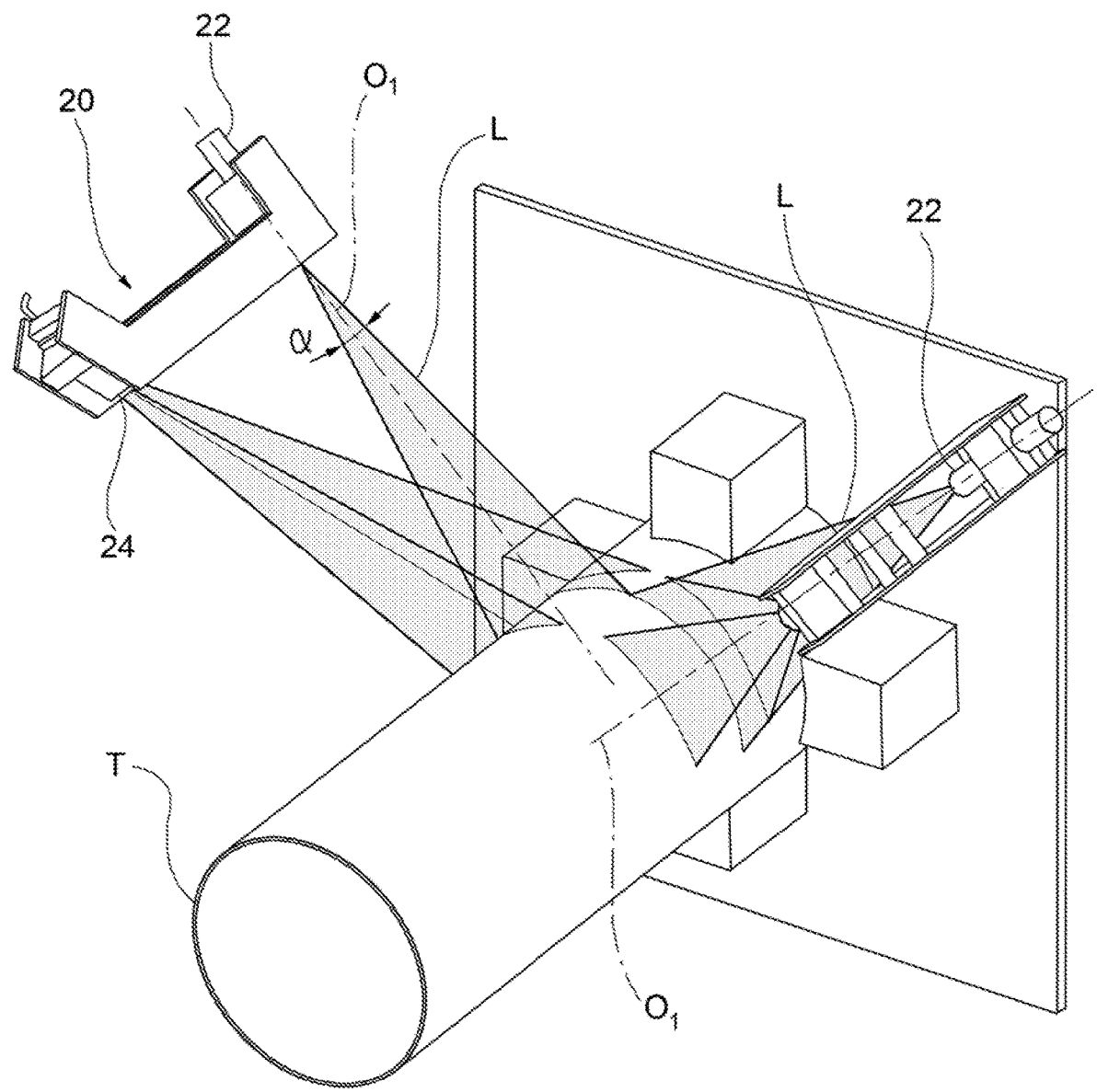
FIGS. 4 and 5 are a perspective view and a front view, respectively, schematically showing the arrangement of the laser scanning modules with respect to the tube or profiled section to be worked in the machine of FIG. 1.

The machine for laser working of tubes and profiled sections according to the present invention is described and illustrated herein with reference to its application to the working of tubes, but it is of course equally well applicable to the working of profiled sections. The tubes or profiled sections the machine is able to work may have cross-sections with different shapes and sizes.

With reference to the drawings, a machine for laser working of tubes according to an embodiment of the present invention comprises, in per-se-known manner, a base generally indicated 10, a working head 12 arranged to carry out a laser working (such as for example a cutting working) on a tube T, a feeding device 14 arranged to cause the tube T to move forward along a longitudinal direction x (coinciding with the direction of the longitudinal axis of the tube T), a guide device 16 arranged to guide the tube T while the latter is being moved forward by the feeding device 14 and a scanning system arranged to scan at least a portion (for example an upper portion) of the outline of the cross-section of the tube T.

The working head 12 comprises, in per-se-known manner, a focussing device 18 arranged to emit a focussed laser beam onto the surface of the tube T. The scanning system comprises two laser scanning modules 20 (or, more generally, at least one laser scanning module), each of which comprises in turn a laser emitter 22 arranged to emit a light blade L to illuminate a portion of the tube T to be worked and a camera 24 arranged to acquire an image of the portion of tube T to be worked illuminated by the light blade L emitted by the laser emitter 22. Although in the illustrated embodiment the laser scanning system comprises two laser scanning modules 20, it might also comprise more than two modules.

The working head 12 is carried by a head-carrying structure 26. The head-carrying structure 26, and therefore also the working head 12, is mounted on a carriage 28 so as to be able to translate in the vertical direction (direction z). The carriage 28 is mounted in turn so as to be able to translate in a transverse direction (direction y) with respect to the base 10 of the machine. Although in the illustrated embodiment the transverse direction y is a horizontal direction, it might even be a direction inclined by a given angle to the horizontal (and obviously also lying in a plane perpendicular to the longitudinal axis of the tube T). The working head 12 is therefore movable in the transverse vertical plane, i.e. in a plane perpendicular to the longitudinal axis x of the tube T, with two degrees of freedom, namely with a translational degree of freedom in the vertical direction z and with a translational degree of freedom in the transverse direction y. Moreover, as it is provided for in the illustrated embodiment, the working head 12 may be mounted on the head-carrying structure 26 so as to be able to tilt about a tilting axis t oriented transversely (or, according to another embodiment, not shown, about two tilting axes perpendicular to each other).

The feeding device 14 is preferably arranged to control not only the translation of the tube T along the direction of the longitudinal axis x (forward movement), but also the rotation of the tube T about the longitudinal axis x. In case of a machine for laser cutting of tubes, it is possible to cut the wall of the tube T along any desired cutting line by properly controlling the degrees of freedom of the movement of the working head 10 (translation along the vertical direction z, translation along the transverse direction y, rotation about the tilting axis t and, possibly, translation along the direction of the longitudinal axis x) and the degrees of freedom of movement of the tube T (translation along the direction of the longitudinal axis x and rotation about the longitudinal axis x).

The two laser scanning modules 20 are mounted on a support structure 30, which is in turn attached to the carriage 28. The laser scanning modules 20 move therefore, along with the carriage 28, and hence along with the working head 10 as well, in the transverse direction y. According to a further embodiment (not shown), the support structure on which the laser scanning modules are mounted is attached to the head-carrying structure, or more generally to a carriage on which the working head is mounted, whereby the laser scanning modules are drivingly connected for translation with the working head both in the transverse direction y and in the vertical direction z.

In the illustrated embodiment, the support structure 30 has a generally C-shaped configuration, with a cross-member 32 that is attached to the carriage 28 and with a pair of side arms 34 that extend longitudinally from the opposite ends of the cross-member 32. Respective mounting flanges 36 are securely connected to the free ends of the side arms 34. Similar mounting flanges 38 are securely connected each to an end of a respective laser scanning module 20. Each laser scanning module 20 can thus be easily mounted on the support structure 30 by connection, for example by screws 40, of the respective mounting flange 38 with the mounting flange 36 of the respective side arm 34.

Figure 5:
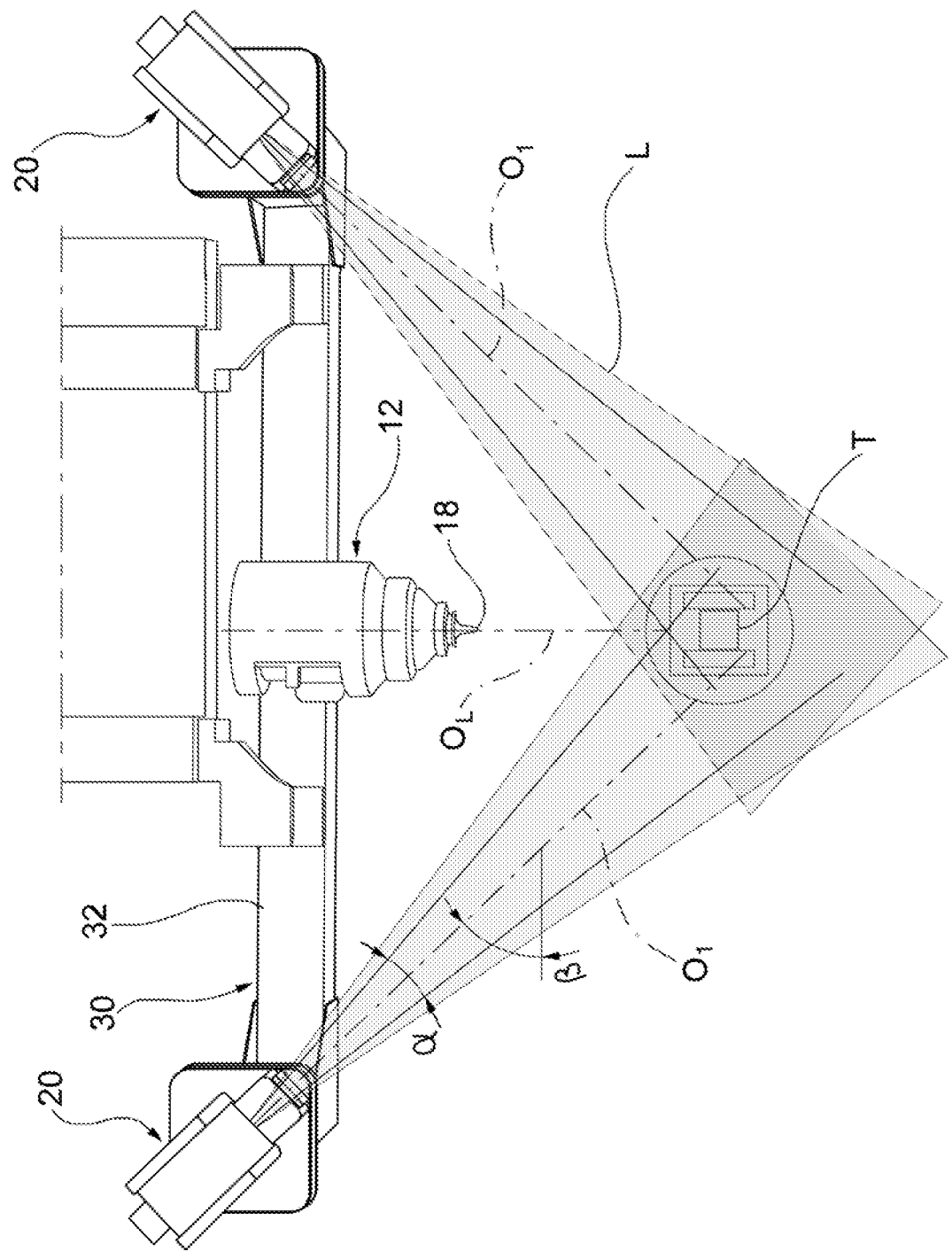

Each laser emitter 22 is arranged to generate a light blade L with a given angle of aperture (commonly known as fan angle) a, equal for example to 20°. Preferably, each laser emitter 22 is provided, in per-se-known manner, with an optical system configured so as to allow uniform diffusion of the light all over the aperture of the blade, or at least over the largest part thereof. Preferably, each laser emitter 22 is mounted in such a manner that its optical axis (indicated $o_1$) lies in a vertical plane. Moreover, the optical axis $o_1$ of each laser emitter 22 is inclined by a given angle β to the horizontal, as shown in FIG. 5. Preferably, the optical axes $o_1$ of the laser emitters 22 lie in a same vertical plane. Preferably, the vertical plane where the optical axes $o_1$ of the laser emitters 22 lie passes through the optical axis $o_L$ of the laser beam emitted by the focussing device 14 of the working head 10. In this way, the scanning system scans the outline of the tube or profiled section just at the cross-section where the laser beam emitted by the working head acts during working. This obviously allows to ensure the highest possible precision.

According to an embodiment, the laser emitters 22 of the laser scanning modules 20 are selected so as to emit light blades L having the same wavelength, in which case the cameras 24 shall acquire the images of the portion of tube T illuminated by the light blades at different times (preferably, at times very close to each other), in order to avoid, especially with tubes having a small-sized cross-section, undesired effects of overlapping of the light blades which might reduce the quality of the images acquired by the cameras. Alternatively, the laser emitters 22 of the laser scanning modules 20 are arranged to emit light blades L having different wavelengths, in which case the cameras 24 can simultaneously acquire the images of the tube T.

Each camera 24 is mounted so that its optical axis (indicated $o_2$) lies in the same plane as the optical axis $o_1$ of the laser emitter 22 of the same laser scanning module 20 and is inclined to the latter so as to enable to acquire the image of the portion of surface of the tube T to be worked that is illuminated by the light blade L emitted by the laser emitter 22. The cameras 24 are connected by a suitable data transfer line (not shown, but of per-se-known type) to a processing unit (also not shown and also of per-se-known type) configured to process the images acquired by each camera to reconstruct the geometry of the whole outline, or at least of a portion thereof, of the cross-section of the tube T to be worked.

A laser scanning system such as the one described above allows to reconstruct the geometry of at least a portion of the outline of the cross-section of a tube or profiled section of any shape and size, exploiting the translational degree of freedom of the laser scanning modules in the transverse direction (and possibly also in the vertical direction) and the rotational degree of freedom of the tube or profiled section to be worked about its longitudinal axis. Furthermore, a laser scanning system such as the one described above allows to detect the actual positioning of the outline (or at least of the portion of outline acquired by the laser scanning modules) with respect to a reference axis, for example the nominal longitudinal axis of the tube or profiled section to be worked.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A laser working machine for laser working of tubes and profiled sections, comprising:
    a working head provided with a a focused laser emitter arranged to emit a focused laser beam on a surface of the tube or profiled section to be worked,
    a carriage on which the working head is mounted, and
    a scanning system arranged to scan at least a portion of the outline of the cross-section of the tube or profiled section,
    wherein the carriage is mounted so as to be able to translate relative to the tube or profiled section both in a longitudinal direction (x) coinciding with the longitudinal axis of the tube or profiled section and in a transverse direction (y),
    wherein the scanning system comprises:
        a plurality of laser scanning modules, each laser scanning module having a laser emitter arranged to emit a light blade with which to illuminate a portion of the tube or profiled section, a camera arranged to acquire an image of the portion of tube or profiled section illuminated by said light blade, and
        a processing unit configured to process the images acquired by each camera to reconstruct the whole outline, or at least a portion thereof, of the cross-section of the tube or profiled section, and
    wherein the working head and said plurality of laser scanning modules are mounted on said carriage so as to be drivingly connected for translation therewith both in the longitudinal direction (x) and in the transverse direction (y),
    wherein said plurality of scanning modules comprise a first scanning module and a second scanning module, wherein the first scanning module comprises a first laser emitter arranged to emit a first light blade and a first camera having a first optical axis and arranged to acquire an image of the portion of tube or profiled section illuminated by said first light blade, and the second scanning module comprises a second laser emitter arranged to emit a second light blade and a second camera having a second optical axis and arranged to acquire an image of the portion of tube or profiled section illuminated by said second light blade, wherein said first light blade and second light blade lie in a same plane orthogonal to said longitudinal direction (x), and wherein said first optical axis and second optical axis form a non-zero angle with each other.

2. The machine according to claim 1, wherein said plane passes through the optical axis ($o_L$) of the focused laser beam emitted by the focused laser emitter of the working head.

3. The machine according to claim 1, wherein the first light blade and the second light blade have the same wavelength.

4. The machine according to claim 1, wherein the first light blade and the second light blade have different wavelengths.

5. The machine according to claim 1, wherein the laser emitter and the camera of each laser scanning module are mounted in such a manner that the optical axis ($o_1$) of the laser emitter lies in a vertical plane and is inclined by a given angle (β) to the horizontal plane, while the optical axis ($o_2$) of the camera lies in the same plane as the optical axis ($o_1$) of the laser emitter and is inclined to the latter.

6. The machine according to claim 1, wherein said carriage is also mounted so as to be able to translate in a vertical direction (z) relative to the tube or profiled section.

7. The machine according to claim 1, further comprising a feeding device arranged to control translation of the tube or profiled section along its longitudinal axis (x) and rotation of the tube or profiled section about its longitudinal axis (x).

* * * * *